United States Patent
Williams et al.

(10) Patent No.: US 9,241,024 B2
(45) Date of Patent: Jan. 19, 2016

(54) FILE SYSTEM INTERFACE TO WEB AND NETWORK SERVICES

(75) Inventors: Gregory A. Williams, Colorado Springs, CO (US); Mark A. Son-Bell, Los Altos, CA (US); Arieh Markel, Lafayette, CO (US); Peter H. Schow, Longmont, CO (US); Carl F. Meske, Jr., San Jose, CA (US)

(73) Assignee: Oracle America Inc., Redwood Shores, CA (US)

( * ) Notice: Subject to any disclaimer, the term of this patent is extended or adjusted under 35 U.S.C. 154(b) by 935 days.

(21) Appl. No.: 11/327,719

(22) Filed: Jan. 6, 2006

(65) Prior Publication Data
US 2007/0162564 A1   Jul. 12, 2007

(51) Int. Cl.
*H04M 3/493*   (2006.01)
*H04M 3/42*   (2006.01)
*H04L 29/08*   (2006.01)

(52) U.S. Cl.
CPC ................ *H04L 67/02* (2013.01); *H04L 67/06* (2013.01)

(58) Field of Classification Search
CPC  G06Q 30/00; G06Q 30/0601; G06Q 30/0641
USPC ............................ 709/219; 395/200; 707/200
See application file for complete search history.

(56) References Cited

U.S. PATENT DOCUMENTS

| | | | | |
|---|---|---|---|---|
| 6,085,234 A | * | 7/2000 | Pitts | G06F 15/173 709/217 |
| 6,317,815 B1 | * | 11/2001 | Mayer | G06F 3/0607 711/162 |
| 2003/0123245 A1 | * | 7/2003 | Parker | F21V 5/00 362/602 |
| 2003/0126245 A1 | * | 7/2003 | Feltin et al. | 709/223 |
| 2003/0182411 A1 | * | 9/2003 | Wang | G06F 8/65 709/223 |
| 2003/0225866 A1 | * | 12/2003 | Hudson | G06F 17/21 709/221 |

FOREIGN PATENT DOCUMENTS

JP   2003196520 A   *   7/2003

OTHER PUBLICATIONS

Cardelini and Casalicchio The State of the Art in Locally Distributed Web Server System Jun. 2002 ACM Computer Survey.*

* cited by examiner

*Primary Examiner* — Asad Nawaz
*Assistant Examiner* — Jason Harley
(74) *Attorney, Agent, or Firm* — Osha • Liang LLP (57) ABSTRACT

A method for providing an interface to a service for a plurality of clients by a backend data center using a remote file system that includes receiving a first file by the remote file system from a client of the plurality of clients, determining the service associated with the first file, reformatting the first file based on the service, transmitting the reformatted first file as a request to the service, receiving a response from the service based on the request, and storing the response in a second file on the remote file system, wherein the second file is accessed remotely by the client from the remote file system, and wherein the first file is simultaneously visible to the client and the backend data center.

15 Claims, 6 Drawing Sheets

FILE SYSTEM INTERFACE TO WEB AND NETWORK SERVICES

BACKGROUND

The typical distributed computer system includes multiple interconnected nodes, connection devices, and a connection medium. One common example of a distributed computer system is the Internet. Through the Internet, nodes in one region of the world are able to communicate with nodes in a different region.

Communication between the client and the server is typically achieved using a variety of communication standards. For example, communication may be performed using SOAP. SOAP is a standard for exchanging XML-based messages typically using HTTP. Specifically, in SOAP messages include a header with an envelope and a body. The header contains relevant information about a message and the body typically includes the message formatted with XML tags.

Another communication standard is Representational State Transfer (REST). In REST, a client makes a request to a server using well-defined operations. Neither, the client nor the server needs to keep track of the state between requests. Similar to SOAP, REST also typically uses the HTTP protocol.

Services, such as web services and network services, typically use the communication to provide functionality to one or more clients. Specifically, a client may send a request to a service. The service processes the request and may or may not send a result back to the client.

For example, a client may desire a computer program product. Accordingly, the customer on a client accesses the website of a merchant's web service through a web browser and submits a request and payment for the computer program product. The web service processes the requests and makes the corresponding computer program available for download to the client. Once the client downloads the computer program product, the client may install the computer program product and execute the program.

Large entities, such as companies, educational institutions, and other organizations often use web services to provide functionality to the employees of the large entity. For example, administrators may access various websites to determine how to keep the computer systems on the large entity current. In order to access the information, the administrator typically uses a web browser and finds the website of the vendors. Once at the website, the administrator must search through the information and determine which components require updating. Next, the administrator typically installs the updates from the Internet.

SUMMARY

In general, in one aspect, the invention relates to a method for providing an interface to a service for a plurality of clients by a backend data center using a remote file system that includes receiving a first file by the remote file system from a client of the plurality of clients, determining the service associated with the first file, reformatting the first file based on the service, transmitting the reformatted first file as a request to the service, receiving a response from the service based on the request, and storing the response in a second file on the remote file system, wherein the second file is accessed remotely by the client from the remote file system, and wherein the first file is simultaneously visible to the client and the backend data center.

In general, in one aspect, the invention relates to a backend data center for providing an interface that includes a service for processing a request for a client of a plurality of clients, and a remote file system for receiving a first file from the client of the plurality of clients, determining the service associated with the first file, reformatting the first file based on the service, transmitting the reformatted first file as the request from the remote file system to the service, receiving a response from the service based on the request, and storing the response in a second file on the remote file system, wherein the second file is accessed remotely by the client from the remote file system, and wherein the first file is simultaneously visible to the client and the backend data center.

In general, in one aspect, the invention relates to a computer system for providing an interface to a service for a plurality of clients by a backend data center that includes a remote file system for receiving a first file from a client of the plurality of clients, a processor within the computer system for executing software instructions to determine the service associated with the first file, reformat the first file based on the service, transmit the reformatted first file as a request to the service, receive a response from the service based on the request, and store the response in a second file on the remote file system, wherein the second file is accessed remotely by the client from the remote file system, and wherein the first file is simultaneously visible to the client and the backend data center.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for communication between a client and a service, such as a web service or network service. Specifically, embodiments of the invention use a remote file system which is accessible by both the client and the service. Using the remote file system, applications and users on the client may store data on the remote file system and have the data transferred to a service for processing. Further, in one or more embodiments of the invention, output from the service is transferred back to the client using the file system interface.

Figure 1:
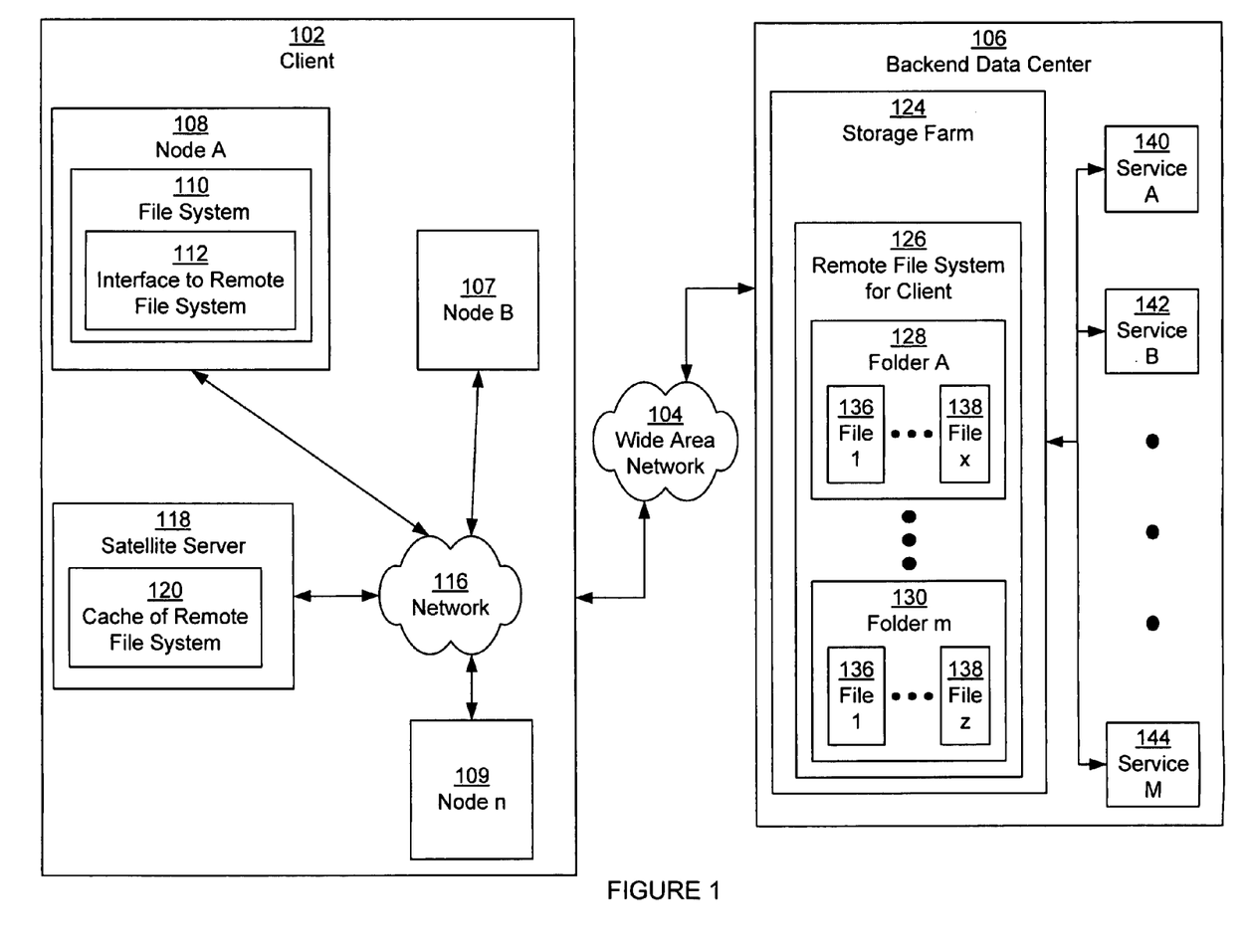
FIG. 1 shows a flow diagram of a system to provide services in accordance with one or more embodiments of the invention.

FIG. 1 shows a flow diagram of a system to provide services in accordance with one or more embodiments of the invention. The system includes a client (102) connected to a backend data center (106) via the wide area network (104) (e.g., the Internet). Each of these components is described in detail below.

As shown in FIG. 1, the client (102) includes a node (e.g., node A (108), node B (107), node n (109)), a network (116), and satellite server (118). Each of these components is described in detail below.

A node (e.g., node A (108), node B (107), node n (109)) corresponds to any type of computing device, such as a laptop computer, personal digital assistant, server, desktop computer, etc. At least one node (e.g., node A (108), node B (107), node n (109)) on the client (102) includes a file system (110) with an interface to a remote file system (112).

The file system (110) may correspond to a file system for the entire client (102) or only for node (108). The file system (110) may correspond to any type of file system known in the art. In one or more embodiments of the present invention, the file system (110) includes an interface to a remote file system (112).

The interface to the remote file system (112) provides access to the remote file system for the client (126) (described below). Specifically, in one or more embodiments of the invention, as part of a directory structure for the file system (110) appears the remote file system. For example, a node may have a file system (110) with a "c:" drive which corresponds to a local hard drive, an "a:" drive which corresponds to a local floppy drive, and an "e:" drive which corresponds to the interface to remote file system (112). Accordingly, in one or more embodiments of the invention, an administrator or application may access files on the remote file system for the client (126) using a similar interface (i.e., user interface (UI) or application programming interface (API)) provided for accessing files on a local disk. Thus, in accordance with one or more embodiments of the invention, the remote file system for the client (126) is simultaneously visible to both the client (102) and the backend data center (106).

Those skilled in the art will appreciate that the computer system node (e.g., node A (108), node B (107), node n (109)) may also include other components, such as various applications (not shown), which include functionality to access the remote file system through the interface for the remote file system (112). Specifically, in one or more embodiments of the invention, the applications may be easily adjusted to save and retrieve files from the remote file system using the interface to the remote file system (112). By performing the simple modifications to the applications, the applications may communicate with a backend data center (106) (described below) to obtain functionality from the backend data center (106) (described below).

Further, those skilled in the art will appreciate that a node (e.g., node A (108), node B (107), node n (109)) may not be located within the parameters of client (102). Specifically, a node (e.g., node A (108), node B (107), node n (109)) may correspond to a laptop computer of a user in transit. Accordingly, a node (e.g., node A (108), node B (107), node n (109)) may be directly connected to the wide area network (104).

However, when the node (e.g., node A (108), node B (107), node n (109)) is within parameters of the client (102), a network (116) may be used to connect the nodes (e.g., node A (108), node B (107), node n (109)). The network (116) may correspond to any type of mechanism for connecting nodes (e.g., node A (108), node B (107), node n (109)). Specifically, the network (116) may correspond to direct connections between the nodes (e.g., node A (108), node B (107), node n (109)), one or more local area network (LANs), wide area networks (WANs), and other such connections.

Connected to the nodes (e.g., node A (108), node B (107), node n (109))) via a network (116) is a satellite server (118). The satellite server (118) is a server that includes functionality to maintain a cache of the remote file system (120) for the client (102). The cache of the remote file system (120) maintains recently accessed information. Accordingly, the satellite server (118) may include a synchronization protocol for synchronizing files between the cache for the remote file system (120) and the remote file system for the client (126). Having a cache for the remote file system (120) reduces bandwidth requirements and increases the availability for the remote file system for the client (126) on the client (102). Alternatively, those skilled in the art will appreciate that the cache for the remote file system (120) may not exist or may be stored in the node (e.g., node A (108), node B (107), node n (109)).

Those skilled in the art will appreciate that while FIG. 1 shows the client (102) as including multiple nodes (e.g., node A (108), node B (107), node n (109)), such as nodes found in a large entity (e.g., company, educational institution, or other organization), the client (102) may also correspond to a single node for an individual user.

Continuing with FIG. 1, a backend data center (106) is connected to the client (102) in accordance with one or more embodiments of the invention. The backend data center (106) corresponds to a group of connected servers (not shown). The backend data center (106) includes functionality to receive files (e.g., file 1 (132), file x (134), file 1 (136), file z (138)) from the client (102) and perform operations on data contained within the files. Components of the backend data center (106) may be physically located together (e.g., in the same building) or physically dispersed. As shown in FIG. 1, the backend data center (106) includes a storage farm (124), and one or more services (e.g., service A (140), service B (142), service M (144)). Each of these components is described in more detail below.

The storage farm (124), in one or more embodiments of the invention, corresponds to at least one server which manages data for several clients.

Specifically, in one or more embodiments of the invention, each client (102) has a remote file system (126) for the client (102) at the storage farm (126). Those skilled in the art will appreciate that the file system structure of the remote file system for the client (126) may be based on the user, based on a computer system, or based on functionality. For example, each user may have user-specific files, each node may have node-specific files, or users and nodes in the same client (102) may share all of the files of the client (102).

Continuing with FIG. 1, in one or more embodiments of the invention, the remote file system (126) includes multiple folders (e.g., folder A (128), folder m (130)). Each folder includes one or more files (e.g., file 1 (132), file x (134), file 1 (136), file z (138)). A file (e.g., file 1 (132), file x (134), file 1 (136), file z (138)) is typically shared between a service (e.g., service A (140), service B (142), service M (144)) and a client (102). Specifically, a file (e.g., file 1 (132), file x (134), file 1 (136), file z (138)) provides a communication medium between a service (e.g., service A (140), service B (142), service M (144)) and the client (102).

In one or more embodiments of the invention, each folder (e.g., folder A (128), folder m (130)) is specific to a particular service (e.g., service A (140), service B (142), service M (144)). Accordingly, in one or more embodiments of the invention, the location of a file (e.g., file 1 (132), file x (134), file 1 (136), file z (138)) within the remote file system for the client (126) specifies a particular service (e.g., service A (140), service B (142), service M (144)). Those skilled in the art will appreciate that the service (e.g., service A (140), service B (142), service M (144)) may also be specified by a file extension by metadata associated with a file or folder, or by using virtually any other technique known in the art.

Continuing with FIG. 1, the backend data center also includes one or more services (e.g., service A (140), service B (142), service M (144)). A service (e.g., service A (140), service B (142), service M (144)) corresponds to any type of component which provides functionality to a client (102), such as a web service or network service, using the remote file system for the client (126). For example, the service (e.g., service A (140), service B (142), service M (144)) may correspond to a commerce service, a patch retrieval service, or a management service. These examples are described below.

A commerce service, for example, may include functionality to process an order for product that a client (102) has stored in a file (e.g., file 1 (132), file x (134), file 1 (136), file z (138)) in the remote file system for the client (126). As part of processing the order, the commerce service may make the products available on the remote file system for the client (126). For example, applications may be available to execute or download from the remote file system for the client (126).

A patch retrieval service, for example, may include functionality to process an inventory of the client (102) that a client (102) has stored in a file (e.g., file 1 (132), file x (134), file 1 (136), file z (138)) in the remote file system for the client (126). As part of processing the inventory, the patch retrieval service may determine which patches are required on the client (102) and make the patches available on the remote file system for the client (126) with information about the patches. Using a patch retrieval service, the client (102) is able to remain continuously updated.

A management service, for example, may include functionality to process client files, such as log files, configuration files, and other such files, that a client (102) has stored in a folder (e.g., folder A (128), folder m (130)) in the remote file system for the client (126). As part of processing client files, the management service may determine how to keep the client (102) operating and current.

Accordingly, the management service may include functionality to modify the client files or add files to the remote file system for the client (126). Using a management service, the client (102) is able to remain continuously operating.

Those skilled in the art will appreciate that the aforementioned examples are only examples of possible services (e.g., service A (140), service B (142), service M (144)) that may be offered through the remote file system for the client (126). Accordingly, there are multiple possible services (e.g., service A (140), service B (142), service M (144)) not stated above which are also possible.

Further, those skilled in the art will appreciate that while FIG. 1 shows the service (e.g., service A (140), service B (142), service M (144)) as a part of the backend data center (106), the service (e.g., service A (140), service B (142), service M (144)) may not be a component of the backend data center (106). For example, the service may be from a third party vendor.

Figure 2:
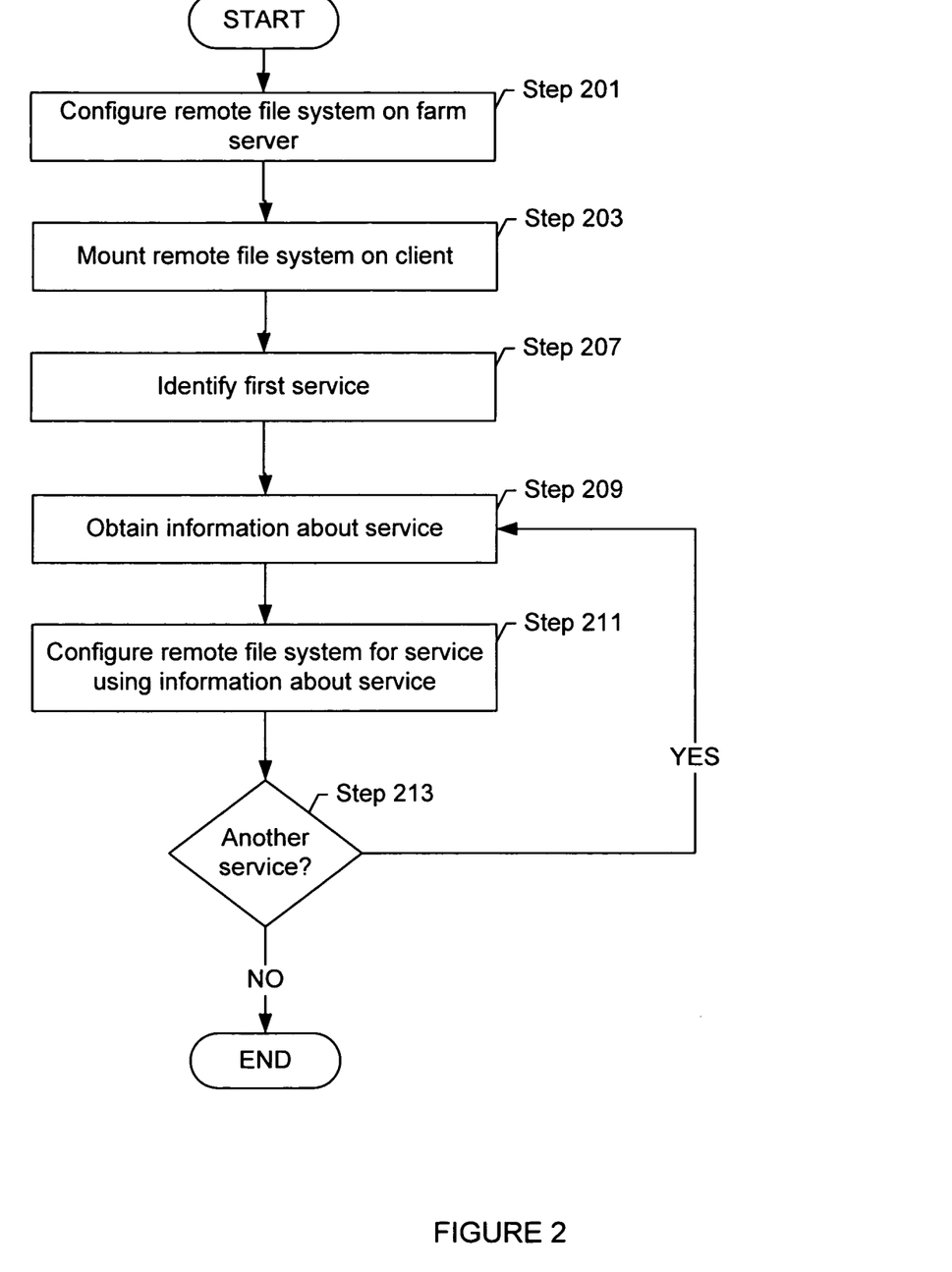
FIG. 2 shows a flowchart of an initialization method for providing services in accordance with one or more embodiments of the invention.

Typically, before the remote file system may be used as a communication link for the client to obtain the functionality from the services, the system must be initialized. FIG. 2 shows a flowchart of an initializing method for providing services in accordance with one or more embodiments of the invention. Initially, a remote file system is configured on the farm server (Step 201). Configuring the remote file system includes setting the file system structure and allowing for connection to the remote file system by the client. Next, the remote file system is mounted on the client (Step 203). Mounting the remote file system for the client may be performed in a central location of the client. Specifically, a user or administrator typically does not need to specify each node on which to mount the remote file system for the client. Once the remote file system for the client is mounted, then at startup, a file system manager is able to discover the remote file system for the client and add the remote file system interface to the file system. After adding the interface to the remote file system, the client is ready for storing requests for services to the backend data center.

Services on the backend data center must also be configured. Continuing with FIG. 2, a first service is identified (Step 207). The service is typically identified by an administrator adding the service to a list of services. Next, information about the services, such as connection requirements and data format requirements, is obtained (Step 209). Information about the service may be obtained from various knowledge sources such as readme files, the website of the service vendors, etc. After obtaining information about the service, the remote file system is configured for the service using the information about the service. Specifically, the service is added to the remote file system. More specifically, if the folders in the remote file system correspond to services which are offered, then a new folder is added to the remote file system for the first service. A listener at the remote file system may also be reconfigured to listen for new files added to the remote file system. Further, the remote file may be configured to re-format files into the format that is required by the service and send the files to the service.

Once the remote file system is configured for the service, then a determination is made whether there is another service (Step 213). If there is another service, then the method continues with obtaining information about the next service (Step 209). Otherwise, the system is ready for transferring requests from the client to a service.

Figure 3:
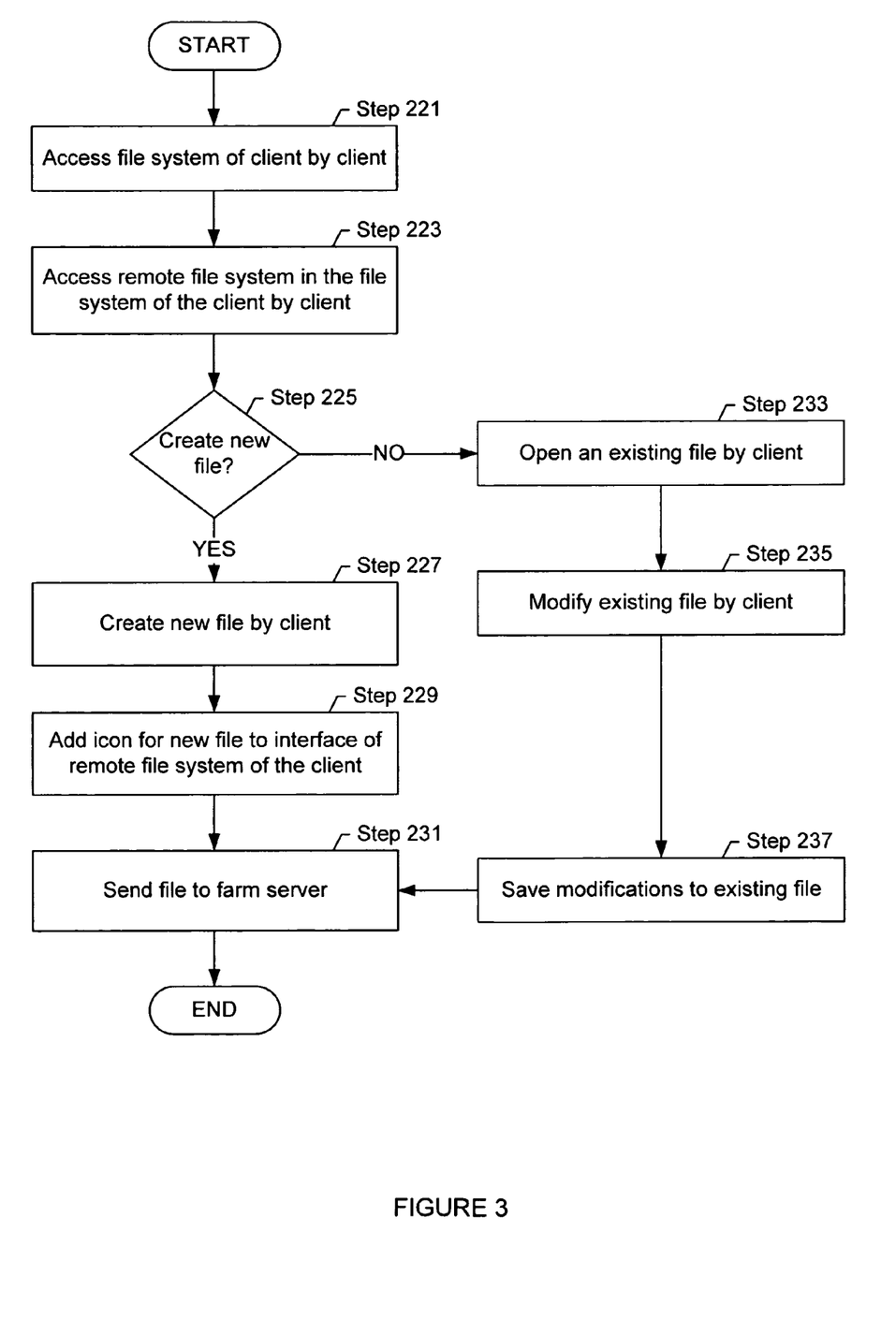
FIG. 3 shows a flowchart of a method for transferring a request to a service using a file system interface in accordance with one or more embodiments of the invention.

FIG. 3 shows a flowchart of a method for transferring a request to a service using a file system interface in accordance with one or more embodiments of the invention. Initially, the file system of the client is accessed by the client (Step 221). Specifically, the client may open a folder, or an application on the remote file system may send a request to the file system. The client may use virtually any interface known in the art, such as command line, graphical user interface, interfaces for applications, etc., for accessing a file system. Next, the remote file system is accessed from the file system of the client by the client (Step 223). Specifically, the client may use a the remote file system interface in the file system of the client. Accessing the remote file system allows the client to send requests to the services by save new files or modify existing files. Accordingly, after accessing the remote file system, a determination is made whether the client wants to create a new file (Step 225). If the client wants to create a new file, then the client creates a new file (Step 227) and an icon for the new file is added to the interface of the remote file system of the client (Step 229). Once the new file is created, then the file is sent to the farm server (Step 231).

Alternatively, if the client does not want to create a new file, then the client wants to modify an existing file. Accordingly, the client opens an existing file (Step 233). Next, the client may modify the existing file (Step 235). In accordance with one or more embodiments of the invention, modifying the existing file may be performed in a manner similar to modifying a file when the file is local. After modifying the existing file, the modifications to the existing file are saved (Step 237) and the file is sent to the farm server (Step 231).

Regardless of whether the file is created or modified, sending the file to the farm server may include caching on a satellite server in the cache for the remote file system. When a file is cached on a satellite server, then the file may be transferred periodically (with other files) or immediately to the backend data center using virtually any synchronization protocol known in the art. Accordingly, after a file is transferred, then the file is ready for processing.

Figure 4:
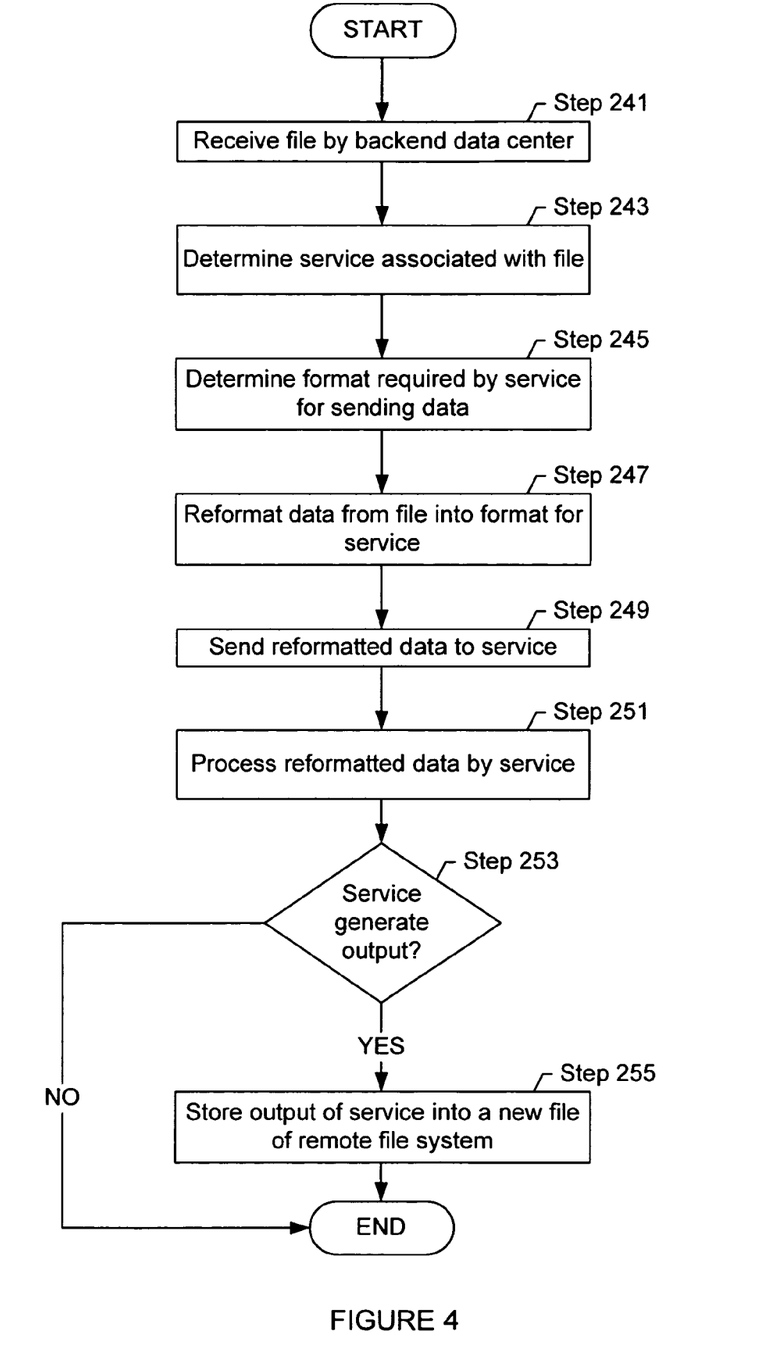
FIG. 4 shows a flowchart of a method for processing a file by a backend data center using a file system interface in accordance with one or more embodiments of the invention.

FIG. 4 shows a flowchart of a method for processing a file by a backend data center using a file system interface in accordance with one or more embodiments of the invention. Initially, the file is received by the backend data center (Step 241). In one or more embodiments of the invention, the process of receiving a file triggers a listener to create a service request. Specifically, after receiving the file, the service associated with the file is determined (Step 243). The service associated with the file may be determined by the location of the file, from meta-data associated with the file, the extension of the file, or using any other such method.

Next, the format required by the service for sending data is determined (Step 245). The required format may be specified, for example, by the information for the service which is gathered in the initialization steps, in accordance with one or more embodiments of the invention.

Continuing with FIG. 4, the data in the file is then reformatted for the service (Step 247) and sent to the service (Step 249). The data may be sent using any method known in the art. For example, if the service requires the data to be inputted into a SQL database, then the data may be reformatted and sent in the form of a SQL query. Next, the data is processed by the service (Step 251). Specifically, the service performs the service specific tasks, such as determining what patches are required (in the case of a patch retrieval service). After processing the data, a determination is made whether the service generates output (Step 253). If the service generates output, then the output of the service may be saved in a new file of the remote file system (Step 255) in accordance with one or more embodiments of the invention. Alternatively, the service may send the output directly to the client and bypass the remote file system. Once the output is saved, then the output is ready for viewing by the client accessing the remote file system.

Figure 5:
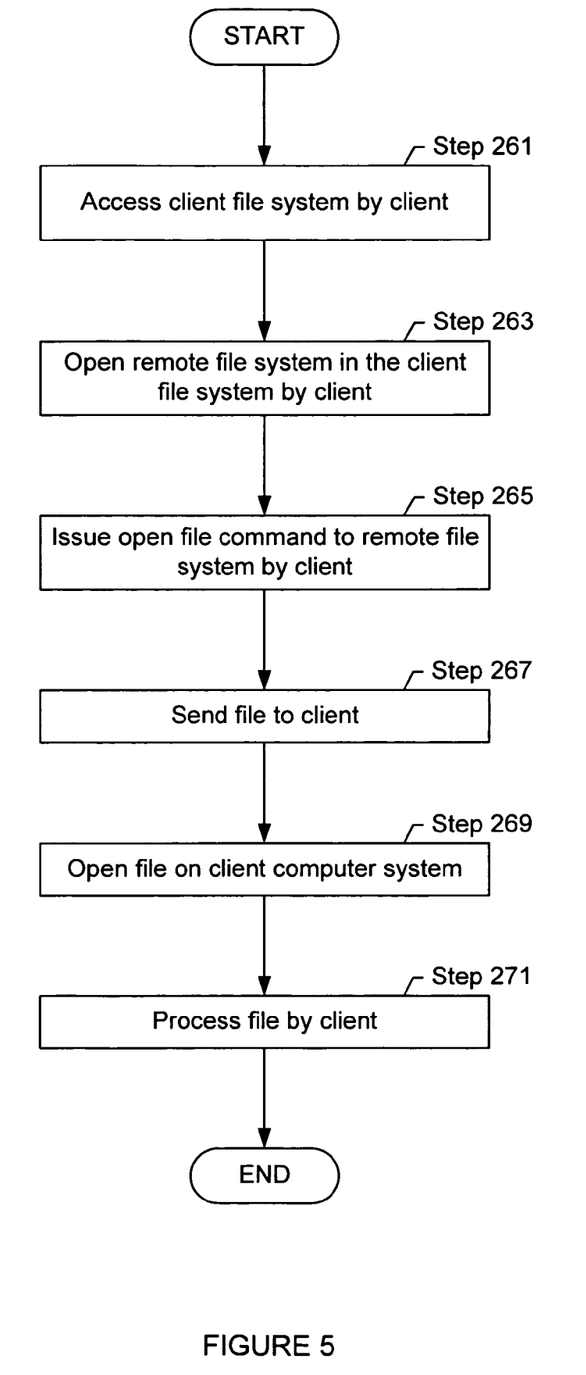
FIG. 5 shows a flowchart of a method for receiving output using a file system interface in accordance with one or more embodiments of the invention.

FIG. 5 shows a flowchart of a method for receiving output using a file system interface in accordance with one or more embodiments of the invention. Initially, the client accesses the client file system (Step 261). After accessing the client file system, then the client opens the remote file system in the client file system (Step 263). Once the remote file system is opened, then the client sends an open file command to the remote file system (Step 265). An open file command corresponds to any open file command known in the art for opening local files. Upon receiving the open file command, the file is sent to the client (Step 267). The file may be sent to the client from the cache of the remote file system on the satellite server or directly from the remote file system. Next, the file is opened on the client computer system (Step 269). The client may then process the file (Step 271). Processing the file may include, for example, opening a folder associated with the file to obtain executables, modifying the client configuration based on the file, or performing any type of function based on the service.

Those skilled in the art will appreciate that the aforementioned steps may be performed by an application or a user. Specifically, a user may use a command line interface or a graphical user interface for accessing the remote file system. Similarly, an application may use the application programming interface for accessing the remote file system. Accordingly, one or more embodiments of the invention allow for a user and application to use a familiar interface to exchange data and services.

Further, one skilled in the art will appreciate that because communication between client and the backend data center is typically performed using the Internet, various security measures well-known in the art are most likely performed. For example, firewalls on both the client and the backend data center may be used to prevent intruders, data may be encrypted and decrypted using virtually any mechanism known in the art, as well as any of the other myriad of security measures known in the art.

In the following example, consider the case in which a company needs to restock supplies. Initially, in this example, a user or inventory manager at the company determines the current inventory. Next, the user or inventory manager saves the inventory to a file in the remote file system. In one or more embodiments of the invention, saving the inventory to a file on the remote file system may be performed as easily as choosing a local folder and saving the file to the local folder. Once the inventory has been saved, the remote server may transfer the inventory to a web service. The web service may analyze the inventory and determine what is missing or outdated. After determining what is missing or outdated, the web service may send to the client via the remote file system, postal mail, or other shipping method that which is missing or outdated. Upon receiving the inventory, the company unpacks the inventory and is considered restocked.

Figure 6:
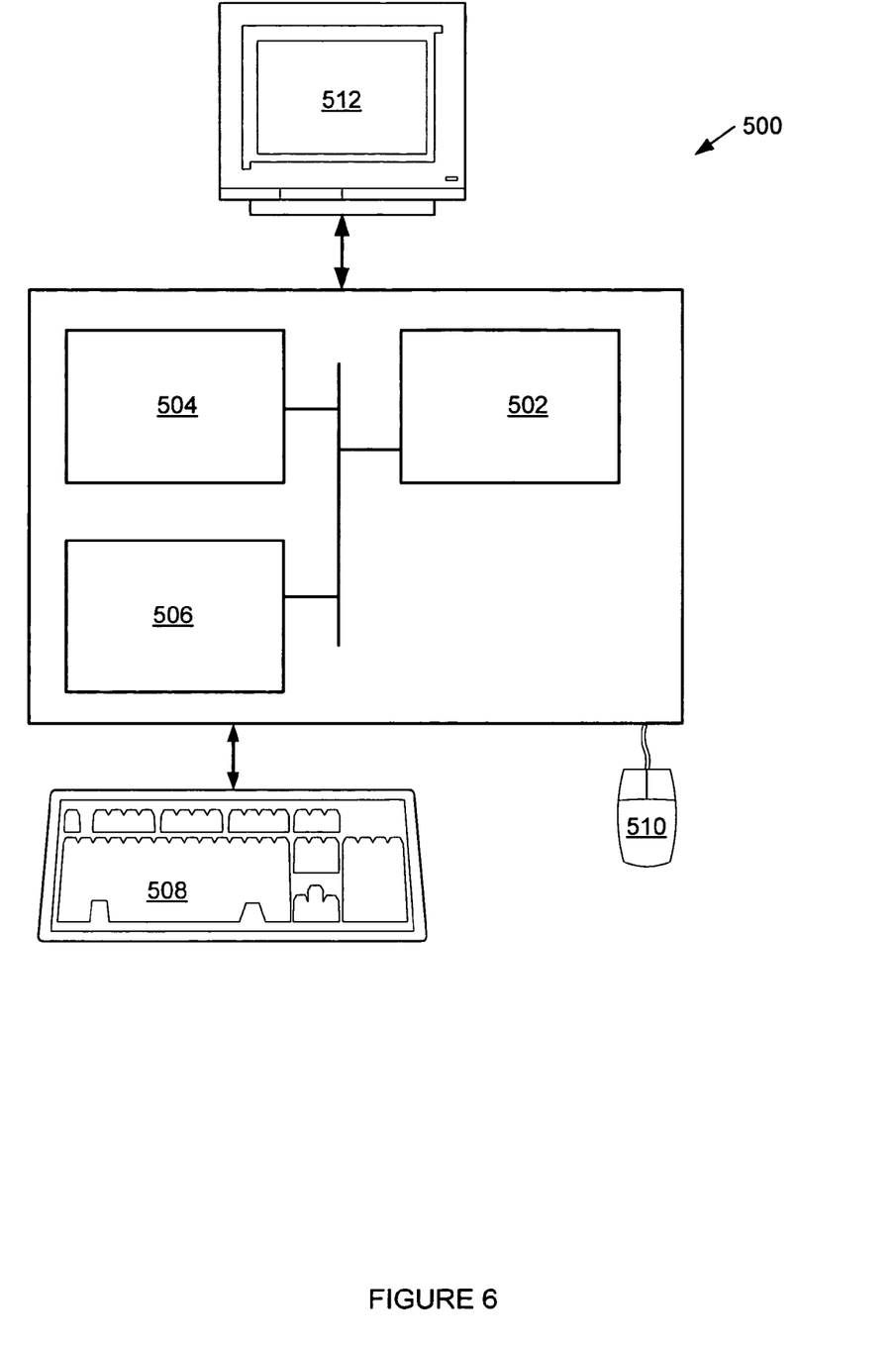
FIG. 6 shows a computer system in accordance with one or more embodiments of the invention.

The invention may be implemented on virtually any type of computer regardless of the platform being used. For example, as shown in FIG. 6, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., remote file system, client, service(s), and the like) may be located on a different node within the distributed system. In one or more embodiments of the invention, the node corresponds to a computer system.

Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Embodiments of this invention have one or more of the following advantages. First, embodiments of the invention use a simple, common interface to provide various services. Specifically, the typical computer system user and programmer interacts with a file system in a known manner. Accordingly, by using a file system as an interface to the services, the typical user or programmer does not need to learn a new interface.

Additionally, embodiments of the invention provide a mechanism whereby clients need new applications to achieve greater functionality. For example, current systems have the ability to take an inventory of itself. By storing the inventory on the remote file system rather than locally, a service is able to keep the client current through management and providing patches.

Also, embodiments of the invention are easily configurable and extendable. Specifically, because the remote file system may be mounted centrally, in a large entity, an administrator does not need to access each computer system at the client. Also, new services may be added by simply adding in the information about accessing the service on the farm server. Accordingly, multiple clients may be able to access new services without reconfiguring the clients.

Further, embodiments of the invention provide a mechanism whereby greater functionality may be provided by the services. For example, rather than requiring that an application be downloaded from the web in order to be executed, the application may be stored in a remote file system of a client and executed from the remote file system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for providing an interface to a plurality of services for a plurality of clients by a backend data center using a remote file system comprising:
receiving a first file by the remote file system from a client of the plurality of clients via a local file system executing on a computer system of the client,
wherein the first file comprises a client inventory listing physical supplies in physical possession of the client,
wherein the local file system comprises a directory structure with an interface to local storage and an interface to the remote file system, and
wherein the computer system is configured to transfer the first file to the remote file system using the interface to the remote file system in the directory structure;
identifying a vendor from the plurality of services associated with the first file, wherein identifying the vendor is triggered by receiving the first file by the remote file system, and wherein the vendor is identified based on a location of the first file within the remote file system;
creating a service request from the first file based on the vendor;
transmitting the service request to the vendor, wherein, based on the service request, the vendor reviews the client inventory to determine that a physical supply is missing from the client inventory and ships the physical supply to the client;
receiving a response to the service request from the vendor; and
storing the response in a second file on the remote file system,
wherein the second file is remotely accessible by the client from the remote file system using the directory structure, and
wherein the second file is simultaneously visible to the client and the backend data center, wherein the second file is visible to the backend data center using the remote file system, and wherein the second file is visible to the client via the interface to the remote file system in the directory structure.

2. The method of claim 1, wherein the vendor is a component of the backend data center.

3. The method of claim 1, wherein the client accesses the remote file system using the Internet.

4. The method of claim 1, wherein the remote file system uses a hierarchy.

5. The method of claim 1, further comprising synchronizing the second file between the remote file system and a cache of the remote file system, wherein the cache executes on a satellite server located at the client.

6. A backend data center comprising:
a plurality of services for processing service requests for a plurality of clients, wherein the plurality of services comprises a vendor; and
a remote file system for:
receiving a first file from a client of the plurality of clients via a local file system executing on a computer system of the client,
wherein the first file comprises a client inventory listing physical supplies in physical possession of the client,
wherein the local file system comprises a directory structure with an interface to local storage and an interface to the remote file system, and
wherein the computer system is configured to transfer the first file to the remote file system using the interface to the remote file system in the directory structure;
identifying the vendor from the plurality of services associated with the first file, wherein identifying the vendor is triggered by receiving the first file by the remote file system, and wherein the vendor is identified based on a location of the first file within the remote file system;
creating the service request from the first file based on the vendor;
transmitting the service request to the vendor, wherein, based on the service request, the vendor reviews the client inventory to determine that a physical supply is missing from the client inventory and ships the physical supply to the client;
receiving a response to the service request from the vendor; and
storing the response in a second file on the remote file system,
wherein the second file is remotely accessible by the client from the remote file system using the directory structure, and
wherein the second file is simultaneously visible to the client and the backend data center, wherein the second file is visible to the backend data center using the remote file system, and wherein the second file is visible to the client via the interface to the remote file system in the directory structure.

7. The backend data center of claim 6, wherein the client accesses the remote file system using the Internet.

8. The backend data center of claim 6, wherein the remote file system uses a hierarchy.

9. The backend data center of claim 6, wherein accessing the second file remotely by the client from the remote file system is performed using a satellite server.

10. The backend data center of claim 9, wherein the second file is synchronized between the remote file system and a cache on the satellite server located at the client.

11. A first computer system for providing an interface to a plurality of services for a plurality of clients by a backend data center comprising:
 a remote file system for receiving a first file from a client of the plurality of clients via a local file system executing on a second computer system located at the client,
  wherein the first file comprises a client inventory listing physical supplies in physical possession of the client,
  wherein the local file system comprises a directory structure with an interface to local storage and an interface to the remote file system, and
  wherein the second computer system is configured to transfer the first file to the remote file system using the interface to the remote file system in the directory structure;
 a processor within the first computer system for executing software instructions to:
  identify a vendor of the plurality of services associated with the first file, wherein identifying the vendor is triggered by receiving the first file by the remote file system, and wherein the vendor is identified based on a location of the first file within the remote file system;
  create a service request from the first file based on the vendor;
  transmit the service request to the vendor, wherein, based on the service request, the vendor reviews the client inventory to determine that a physical supply is missing from the client inventory and ships the physical supply to the client;
  receive a response to the service request from the vendor; and
  store the response in a second file on the remote file system,
  wherein the second file is remotely accessible by the client from the remote file system using the directory structure, and
  wherein the second file is simultaneously visible to the client and the backend data center, wherein the second file is visible to the backend data center using the remote file system, and wherein the second file is visible to the client via the interface to the remote file system in the directory structure.

12. The first computer system of claim 11, wherein the processor is further configured to synchronize the second file between the remote file system and a cache of the remote file system, wherein the cache executes on a satellite server located at the client.

13. The method of claim 1, wherein the plurality of services further comprises a patch retrieval service and a management service,
 wherein the patch retrieval service:
  processes an inventory stored in a third file on the remote file system received via the local file system to determine whether a patch is required; and
  stores the patch in the second file when the patch is required based on the inventory, and
 wherein the management service:
  processes a fourth file on the remote file system received via the local file system to determine how a computer system of the client is operating; and
  performs one selected from a group consisting of modifying the fourth file and generating a fifth file to replace the fourth file on the client when the computer system of the client is not current.

14. The backend data center of claim 6, wherein the plurality of services further comprises a patch retrieval service and a management service,
 wherein the patch retrieval service is configured to:
  process an inventory stored in a third file on the remote file system received via the local file system to determine whether a patch is required; and
  store the patch in the second file when the patch is required based on the inventory, and
 wherein the management service is configured to:
  process a fourth file on the remote file system received via the local file system to determine how a computer system of the client is operating; and
  perform one selected from a group consisting of modifying the fourth file and generating a fifth file to replace the fourth file on the client when the computer system of the client is not current.

15. The first computer system of claim 11, wherein the plurality of services further comprises a patch retrieval service and a management service,
 wherein the patch retrieval service is configured to:
  process an inventory stored in a third file on the remote file system received via the local file system to determine whether a patch is required; and
  store the patch in the second file when the patch is required based on the inventory, and
 wherein the management service is configured to:
  process a fourth file on the remote file system received via the local file system to determine how a computer system of the client is operating; and
 perform one selected from a group consisting of modifying the fourth file and generating a fifth file to replace the fourth file on the client when the computer system of the client is not current.

* * * * *